US008593465B2

(12) United States Patent
Leather et al.

(10) Patent No.: US 8,593,465 B2
(45) Date of Patent: Nov. 26, 2013

(54) HANDLING OF EXTRA CONTEXTS FOR SHADER CONSTANTS

(75) Inventors: Mark M. Leather, Los Gatos, CA (US); Brian D. Emberling, San Mateo, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 612 days.

(21) Appl. No.: 11/808,887

(22) Filed: Jun. 13, 2007

(65) Prior Publication Data

US 2008/0313436 A1    Dec. 18, 2008

(51) Int. Cl.
 *G06T 1/20* (2006.01)
(52) U.S. Cl.
 USPC .............. 345/501; 345/522; 712/214
(58) Field of Classification Search
 USPC ......................... 345/501, 522, 559
 See application file for complete search history.

(56) References Cited

U.S. PATENT DOCUMENTS

| | | | | |
|---|---|---|---|---|
| 6,915,356 | B1 * | 7/2005 | Dwork | 710/9 |
| 7,456,833 | B1 * | 11/2008 | Diard | 345/440 |
| 2001/0042190 | A1 * | 11/2001 | Tremblay et al. | 712/208 |
| 2002/0003541 | A1 * | 1/2002 | Boyd et al. | 345/501 |
| 2003/0030643 | A1 * | 2/2003 | Taylor et al. | 345/531 |
| 2004/0003211 | A1 * | 1/2004 | Damron | 712/228 |
| 2007/0198813 | A1 * | 8/2007 | Favor et al. | 712/217 |
| 2008/0001956 | A1 * | 1/2008 | Markovic et al. | 345/522 |
| 2008/0005731 | A1 * | 1/2008 | Markovic et al. | 717/162 |
| 2008/0034311 | A1 * | 2/2008 | Aguaviva et al. | 715/771 |
| 2008/0252652 | A1 * | 10/2008 | Jiao et al. | 345/582 |
| 2009/0085919 | A1 * | 4/2009 | Chen et al. | 345/520 |

OTHER PUBLICATIONS

Gray (Microsoft Directx 9 Programmable Graphics Pipeline); Microsoft Press; Jul. 16, 2003.*
Wikipedia (Hardware description language page); May 17, 2006 version.*
Blythe (Direct3D 10) SIGGRAPH 2006, Course 3, GPU Shading and Rendering.*
Blythe (The Direct3D 10 System) ACM 2006.*
Shah et al. (DirectX Constants Optimizations for Intel Integrated Graphics); Dec. 2008.*
Peeper (Introduction to the DirectX 9 High Level Shading Language); from Shader X2—Introduction and Tutorials with DirectX 9, Nov. 2003.*
Bruce Dawson, "Coding for Multiple Cores on Xbox 360 and Microsoft Windows", XNA Developer Connection (XDC), Aug. 2006, 9 pages, printed from website http://msdn2.microsoft.com/en-us/library/bb204834(d=printer).aspx on Oct. 12, 2007.

(Continued)

*Primary Examiner* — Keith Vicary
(74) *Attorney, Agent, or Firm* — Sterne, Kessler, Goldstein & Fox P.L.L.C.

(57) ABSTRACT

The present invention provides a system for handling extra contexts for shader constants, and applications thereof. In an embodiment there is provided a computer-based method for executing a series of compute packets in an execution pipeline. The execution pipeline includes a first plurality of registers configured to store state-updates of a first type and a second plurality of registers configured to store state-updates of a second type. A first number of state-updates of the first type and a second number of state-updates of the second type are respectively identified and stored in the first and second plurality of registers. A compute packet is sent to the execution pipeline responsive to the first number and the second number. Then, the compute packet is executed by the execution pipeline.

25 Claims, 5 Drawing Sheets

(56) References Cited

OTHER PUBLICATIONS

Chuck Walbourn, "Game Timing and Multicore Processors", XNA Developer Connection (XDC), Dec. 2005, 2 pages, printed from website http://msdn2.microsoft.com/en-us/library/bb173458(d=printer).aspx on Oct. 12, 2007.

"Multiprocessor Considerations for Kernel-Mode Drivers", Windows Hardware and Driver Central, Oct. 28, 2004, 29 pages.

Khang Nguyen and Shihjong Kuo, "Detecting Multi-Core Processor Topology in an IA-32 Platform", Intel Leap ahead, 2006, 17 pages.

\* cited by examiner

HANDLING OF EXTRA CONTEXTS FOR SHADER CONSTANTS

BACKGROUND OF THE INVENTION

1. Field of the Invention

The present invention is generally directed to computing operations performed in computer systems.

2. Background Art

A graphics processing unit (GPU) is a complex integrated circuit that is specially designed to perform graphics processing tasks. A GPU may, for example, execute graphics processing tasks required by an end-user application, such as a video game application. In such an example, there are several layers of software between the end-user application and the GPU. The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

Many GPUs use a technique known as pipelining to execute the instructions. Pipelining enables a GPU to work on different steps of an instruction at the same time, and thereby take advantage of parallelism that exists among the steps needed to execute the instruction. As a result, a GPU can execute more instructions in a shorter period of time. The video data output by the graphics pipeline are dependent on state packages—i.e., context-specific constants (such as texture handles, shader constants, transform matrices, etc.) that are locally stored by the graphics pipeline. Because the context-specific constants are locally maintained, they can be quickly accessed by the graphics pipeline.

The number of state packages maintained by the graphics pipeline depends on the API to which the GPU is coupled. The state packages associated with conventional APIs can be stored in a relatively small number of registers, such as eight registers. Unlike conventional APIs, newer APIs, such as DirectX® 10, require a relatively large number of frequent context switches with respect to certain aspects of the pipeline. The number of state packages associated with these frequent context switches cannot be supported by the relatively small number of registers maintained by conventional graphics pipelines.

An obvious solution for handling the larger number of state packages associated with newer APIs is to simply increase the number of state packages supported by the graphics pipeline. However, this solution would significantly increase die area because additional registers would be required to handle the additional state packages. In addition, this solution could create timing issues because the graphics pipeline would stall if the number of state packages exceeds the storage capacity of the pipeline. Another obvious solution would be to attempt to compensate for the increased number of state packages using software. For example, the driver or the end-user application could attempt to re-order work sent to the GPU to reduce the number of state changes (increase work sent per state change). This solution, however, has at least two drawbacks. First, this solution will only work with some workloads (some inherently have too many state changes). Second, it significantly increases the workload of the CPU to search and sort input transactions.

Given the foregoing, what is needed is a system, and applications thereof, that efficiently handle extra contexts for shader constants.

BRIEF SUMMARY OF THE INVENTION

The present invention provides a system for handling extra contexts for shader constants, and applications thereof. In an embodiment there is provided a computer-based method for executing a series of compute packets in an execution pipeline. The execution pipeline includes a first plurality of registers configured to store state-updates of a first type and a second plurality of registers configured to store state-updates of a second type. A first number of state-updates of the first type and a second number of state-updates of the second type are respectively identified and stored in the first and second plurality of registers. A compute packet is sent to the execution pipeline responsive to the first number and the second number. Then, the compute packet is executed by the execution pipeline.

In accordance with another embodiment of the present invention there is provided a computer readable medium containing instructions for generating a processor which when executed are adapted to create the processor. The processor comprises an execution pipeline that includes a first plurality of registers configured to store state-updates of a first type and a second plurality of registers configured to store state-updates of a second type. The processor is adapted to identify a first number of state-updates of the first type and a second number of state-updates of the second type respectively stored in the first and second plurality of registers. Responsive to the first number and the second number, a compute packet is sent to the execution pipeline. Then, the compute packet is executed by the execution pipeline.

In accordance with a further embodiment of the present invention there is provided a processor for executing a series of compute packets. The processor comprises an execution pipeline and a scheduler. The execution pipeline includes a first plurality of registers configured to store state-updates of a first type and a second plurality of registers configured to store state-updates of a second type. Based on the state-updates stored in the first and second plurality of registers, the execution pipeline is configured to execute compute packets. The scheduler is configured (i) to identify a first number of state-updates of the first type and a second number of state-updates of the second type respectively stored in the first plurality of registers and the second plurality of registers and (ii) to send compute packets to the execution pipeline responsive to the first and second numbers.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
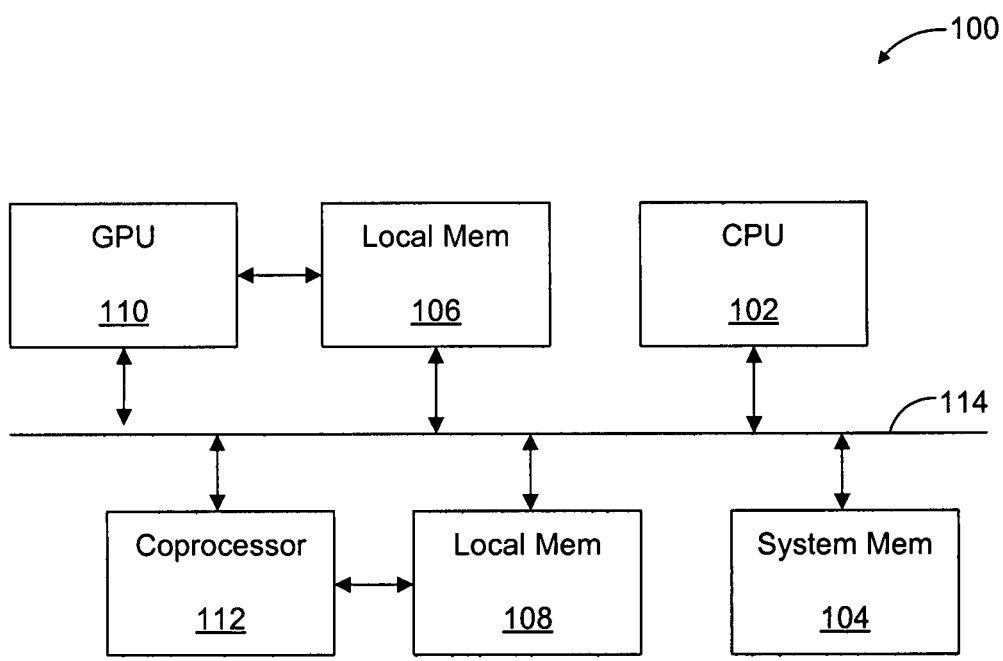
FIG. 1 depicts a block diagram illustrating an example computer system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present invention provides a system for handling extra contexts for shader constants, and applications thereof. In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In accordance with an embodiment of the present invention, a scheduler is configured to support state packages of a first type ("mini-packages") and state packages of a second type ("standard packages"). Mini-packages are stored in registers of an execution pipeline that hold a relatively small amount of data. These mini-packages comprise frequently accessed or updated data, such as shader constants and texture handles. In an embodiment, the execution pipeline includes sixty-four registers that store mini-packages. The standard packages are stored in registers of the execution pipeline that hold a relatively large amount of data. These standard packages comprise infrequently accessed data. In an embodiment, the execution pipeline includes eight registers that store standard packages. The scheduler decides whether to use a mini-package or a standard package for each context switch. In an embodiment, the scheduler identifies a state package as a mini-package or a standard package based on a register address of the state package.

For illustrative purposes only, and not limitation, the present invention will be described herein in terms of a GPU. A person skill in the relevant art(s) will appreciate, however, that the present invention may be applied to other types of processors, such as central processing units and coprocessors, that divide input into alternating streams of state-updates and compute packets. These other types of processors are contemplated within the spirit and scope of the present invention.

A GPU typically receives streams of input of the following form:
update state
draw call
update state
draw call
...
The state-updates specify contents of the graphics pipeline to be updated. For example, a state-update may update the number of colors to be blended by a color buffer of the graphics pipeline. The draw call causes the graphics pipeline to execute a draw. The execution of the draw may include Boolean operations, integer operations, floating point operations, and other operations as would be apparent to a person skilled in the relevant art(s). The execution of the draw call depends on the state of the graphics pipeline.

The streams of state-updates to a graphics pipeline are stored in state registers of a GPU. Of the hundreds of state, registers in the GPU, a select few are updated much more often than any others. In accordance with an embodiment of the present invention, the scheduler, which receives this input, maintains two sets of state pointers-one for mini-states (which are stored in mini-state registers) and one for standard states (which are stored in standard state registers). Whenever the "update-state" package writes a mini-state register, the mini-state pointer is incremented and a new mini-state is allocated. The standard-state pointer is only incremented if a standard state register is touched. When a draw call is received, it is tagged with the two state pointers. Throughout the pipe, these two pointers indicate which standard and/or mini state registers should be used for this draw. In an embodiment, there are sixty-four mini-state registers and eight standard state registers, allowing mini states to be updated eight times as often as the standard states, with little extra area and trivial extra bookkeeping.

When the draw completes, the state packages allocated to that draw are deallocated from the registers (standard, mini or both). If an update-state arrives at the scheduler and there are no more standard or mini state registers free, the scheduler stalls until earlier draw calls finish and deallocate a state register.

A person skilled in the relevant art will appreciate that the embodiments described herein can be extended to more than two classes of state updates.

II. An Example System

FIG. 1 is a block diagram of a computer system 100 according to an embodiment. System 100 includes a central processing unit (CPU) 102, a graphics processing unit (GPU) 110, and may optionally include a coprocessor 112. In addition, computer system 100 includes a system memory 104 that may be accessed by CPU 102, GPU 110, and coprocessor 112. GPU 110 and coprocessor 112 communicate with CPU 102 and the system memory over a bus 114. Bus 114 may be any type of bus used in computer systems, including a peripheral component interface (PCI) bus, an accelerated graphics port (AGP) bus, and a PCI Express (PCIE) bus. GPU 110 and coprocessor 112 assist CPU 102 by performing certain special functions, usually faster than CPU 102 could perform them in software. Coprocessor 112 may comprise, but is not limited to, a floating point coprocessor, a GPU, a networking coprocessor, and other types of coprocessors and processors as would be apparent to a person skilled in the relevant art(s). In alternative embodiments, the GPU may be integrated into a chipset and/or CPU.

System 100 further includes local memory 106 and local memory 108. Local memory 106 is coupled to GPU 110 and also coupled to bus 114. Local memory 108 is coupled to coprocessor 112 and also coupled to bus 114. Local memories 106 and 108 are available to GPU 110 and coprocessor 112 respectively in order to provide faster access to certain data (such as data that is frequently used) than would be possible if the data were stored in system memory 104.

In an embodiment, GPU 110 and coprocessor 112 decode instructions in parallel with CPU 102 and execute only those instructions intended for them. In another embodiment, CPU 102 sends instructions intended for GPU 110 and coprocessor 112 to respective command buffers.

Figure 2:
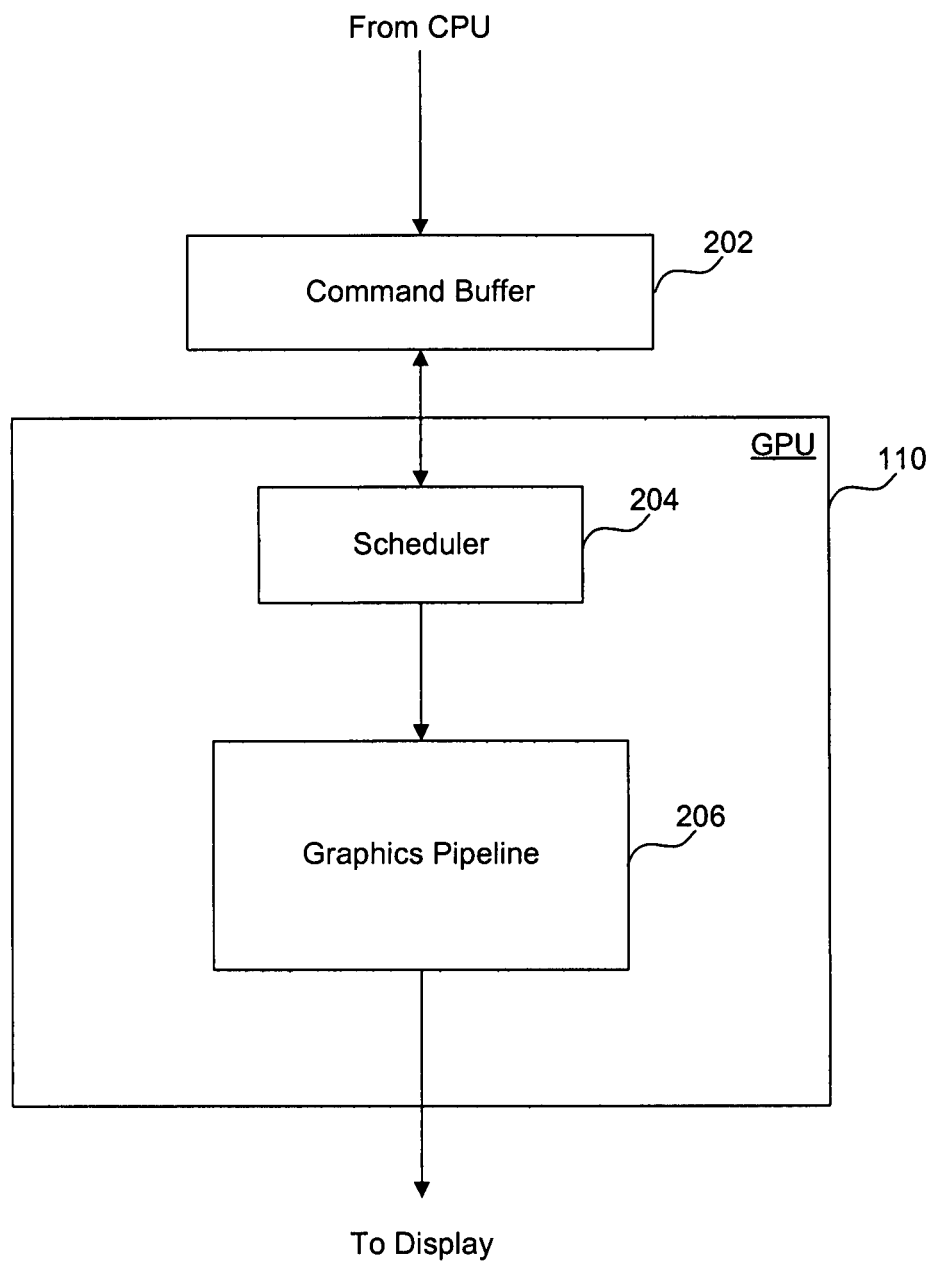
FIG. 2 depicts a block diagram illustrating a GPU in accordance with an embodiment of the present invention.

For example, FIG. 2 depicts a block diagram illustrating an embodiment in which CPU 102 sends instructions intended for GPU 110 to a command buffer 202. Command buffer 202 may be located, for example, in system memory 104 or may be a separate memory coupled to bus 114. As illustrated in FIG. 2, GPU 110 includes a scheduler 204 and a graphics pipeline 206. Scheduler 204 retrieves instructions from command buffer 202. Scheduler 204 forwards the instructions to graphics pipeline 206 responsive to the number of state registers available to be written, as described in more detail below.

Figure 3:
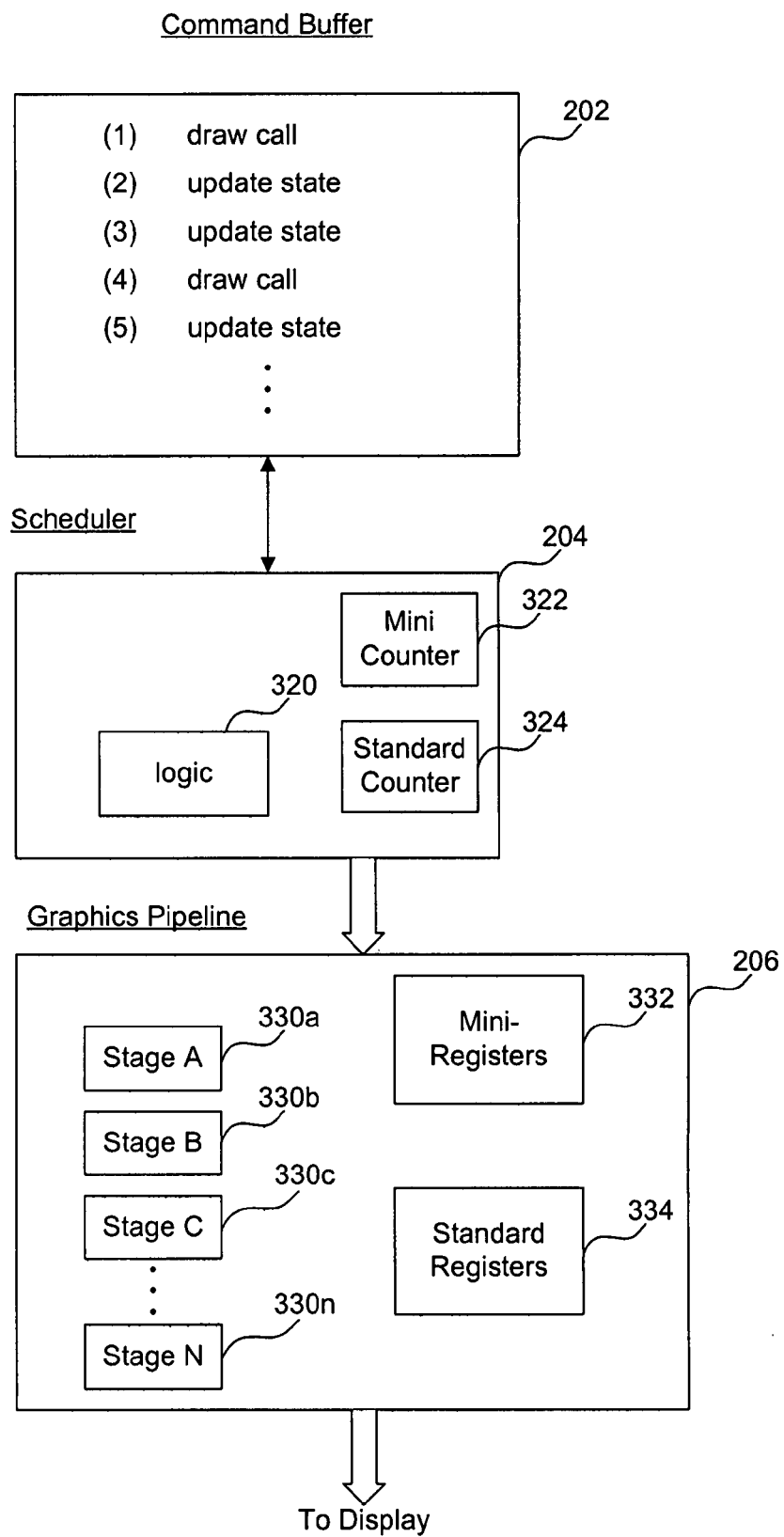
FIG. 3 illustrates additional detail of the GPU of FIG. 2.

FIG. 3 depicts a block diagram illustrating additional features included in command buffer 202, scheduler 204, and graphics pipeline 206. As shown in FIG. 3, command buffer 202 temporarily stores the stream of commands that comprise input to GPU 110. The stream of commands may include, for example, draw call packets and state update packets. However, the invention is not so limited. Other commands may be included in the stream of commands as would be apparent to a person skilled in the relevant art(s). A draw call packet is a command that causes graphics pipeline 206 to execute processes on video data to be output for display. A state update packet is a constant or a collection of constants that update the state of graphics pipeline 206. A state update packet may, for example, update colors that are to be blended during execution of a draw command.

The execution of a draw call is dependent on all the state updates that were retrieved since a previous draw call. For example, FIG. 3 illustrates five commands that are included in the command stream—(1) a first draw call, (2) a first update state, (3) a second update state, (4) a second draw call, and (5) a third update state. The second draw call is dependent on the first and second state updates because these are the state updates that were retrieved since the first draw call. As described in more detail below, the state update packets are identified as belonging to one of two different classes-such as mini updates packets and standard updates packets.

Scheduler 204 includes logic 320, a mini counter 322, and a standard counter 324. Logic 320 is configured to identify the state update packets as either mini update packets or standard update packets. In an embodiment, the update packets comprise a register address that is to be written. In this embodiment, logic 320 identifies whether a state update packet is a mini update packet or a standard update packet based on whether the register address of the state update packet is within a given address range. For example, if the register address of a state update is less than a first predetermined address A and greater than or equal to a second predetermined address B, then the state update is identified as a mini state update; whereas if the register address is not within the address range specified by A and B, then the state update is identified as a standard update. This example is summarized as follows:

IF $(A > \text{register address} \geq B) \Rightarrow$ mini state update;

IF $\neg (A > \text{register address} \geq B) \Rightarrow$ standard state update.

It is to be appreciated, however, that other schemes for parsing state updates can be used without deviating from the spirit and scope of the present invention.

Mini counter 322 keeps track of the number of mini state updates and standard counter 324 keeps track of the number of standard updates respectively written to graphics pipeline 206. As described in more detail below, the number of mini state updates written cannot exceed a first predetermined number (such as sixty-four) and the number of standard updates cannot exceed a second predetermined number (such as eight).

Graphics pipeline 206 includes a plurality of stages, such as stage A 330a through stage N 330n, that execute varies aspects of a draw call, as is well-known to a person skilled in the relevant art(s). The execution of the draw call is dependent on the mini states and standard states respectively stored in mini registers 332 and standard registers 334. In accordance with an embodiment of the present invention, the number of mini registers 332 is greater than the number of standard registers 334. As a result, mini states can be updated more frequently than standard states. In an embodiment, there are sixty-four mini registers 332 and eight standard registers 334, thereby allowing mini states to be updated eight times as often as standard states.

III. Example Operation

As mentioned above, scheduler 204 retrieves state updates and draw commands from command buffer 202, and then sends them to graphics processor 206. An example manner in which state updates and draw commands are processed is described below with reference to FIGS. 4 and 5, respectively.

Figure 4:
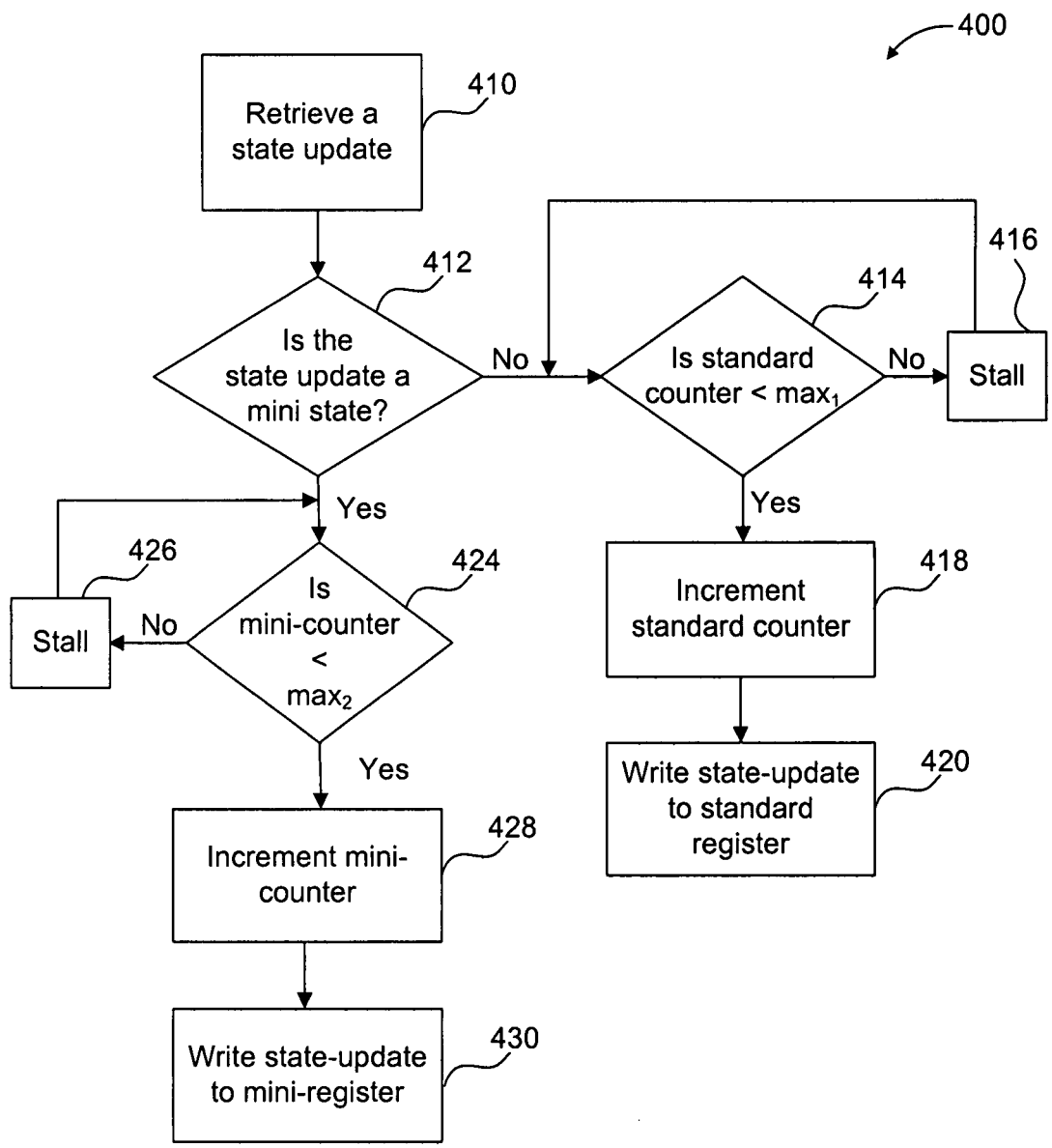
FIG. 4 depicts a flowchart illustrating an example method for processing a state update in accordance with an embodiment of the present invention.

FIG. 4 depicts a flowchart illustrating an example method 400 for writing state updates in accordance with an embodiment of the present invention. As shown in FIG. 4, method 400 begins at a step 410 in which scheduler 204 retrieves a state update from command buffer 202.

In a step 412, logic 320 determines whether the state update is a mini state or a standard state. As mentioned above, this determination may be based on whether the register address of the state update is within a given address range.

If logic 320 determines that the state update is not a mini state, then method 400 proceeds to a step 414. In step 414, scheduler 204 determines whether standard counter 324 is less than the number of standard registers 334 ($\max_1$) included in graphics pipeline 206. If it is, standard counter 324 is incremented, as illustrated in step 418, and the state update is written to one of standard registers 334, as illustrated in step 420.

If, however, scheduler 204 determines that standard counter 324 is not less than the number of standard registers 334 in step 414, then method 400 stalls as illustrated in step 416. If method 400 stalls, scheduler 204 must wait until an earlier issued draw command finishes and deallocates a standard state, as described in more detail with reference to FIG. 5.

If, in step 412, logic 320 determines that the state update is a mini state, then method 400 proceeds to a step 424. In step 424, scheduler 204 determines whether mini counter 332 is less than the number of mini registers 332 (max$_2$) included in graphics pipeline 206. If it is, mini counter 322 is incremented, as illustrated in step 428, and the state update is written to one of mini registers 332, as illustrated in step 430.

If, however, scheduler 204 determines that mini counter 322 is not less than the number of mini registers 332 in step 424, then method 400 stalls as illustrated in step 426. If method 400 stalls, scheduler 204 must wait until an earlier issued draw command finishes and deallocates a mini state, as described in more detail with reference to FIG. 5.

Figure 5:
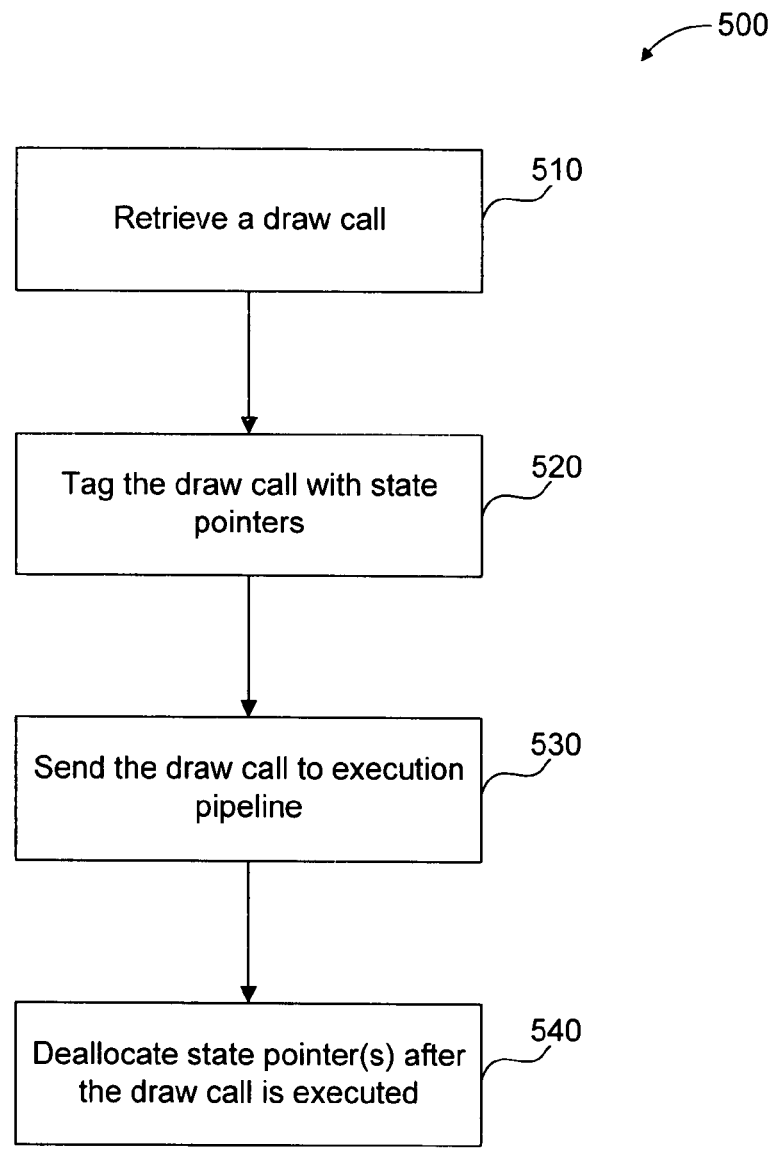
FIG. 5 depicts a flowchart illustrating an example method for processing a draw call in accordance with an embodiment of the present invention.

FIG. 5 depicts a flowchart illustrating an example method 500 for executing a draw call in accordance with an embodiment of the present invention. As shown in FIG. 5, method 500 begins at a step 510 in which scheduler 204 retrieves a draw call from command buffer 202.

In a step 520, the draw call is tagged with state pointers corresponding to all state updates—both mini updates and standard updates—that were retrieved since the previous draw call was retrieved. Then, in a step 530, the draw call is sent through graphics pipeline 206. Throughout stages 330 of graphics pipeline 206, the state pointers indicate which mini registers 332 and/or standard registers 334 should be used during the execution of the draw call.

Upon completion of the draw call, the state packages allocated to the draw call are deallocated, as illustrated in 540. In addition, mini counter 322 and/or standard counter 324 are decremented in accordance with the number of mini state packages and standard state packages that are deallocated.

IV. Example Software Implementations

In addition to hardware implementations of GPU 110, such GPUs may also be embodied in software disposed, for example, in a computer usable (e.g., readable) medium configured to store the software (e.g., a computer readable program code). The program code causes the enablement of embodiments of the present invention, including the following embodiments: (i) the functions of the systems and techniques disclosed herein (such as writing state updates as described with reference to FIG. 4 and/or executing draw commands as described with reference to FIG. 5); (ii) the fabrication of the systems and techniques disclosed herein (such as the fabrication of GPU 110); or (iii) a combination of the functions and fabrication of the systems and techniques disclosed herein.

For example, this can be accomplished through the use of general programming languages (such as C or C++), hardware description languages (HDL) including Verilog HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

V. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-based method for executing a series of compute packets in an execution pipeline, the computer-based method comprising:
    determining by a scheduler, upon receiving a state-update from a command buffer, whether the state-update is a first type state-update or a second type state-update based on whether a register address of the state-update is within a register address range, wherein a result of the determination is associated with an access frequency of the register address of the state-update; and
    storing the state-update based on the determination whether the state-update is the first type or the second type state-update, wherein updates corresponding to the first type state-updates are stored in a first set of registers and updates corresponding to the second type state-updates are stored in a second set of registers in the execution pipeline;
    wherein the execution pipeline executes the compute packets based on the state-update and the register address range.

2. The computer-based method of claim 1, further comprising:
    identifying a first quantity of state-updates of the first type stored in the first set of registers, wherein identifying the first quantity of state-updates includes maintaining a first counter corresponding to the first quantity of state-updates of the first type; and
    identifying a second quantity of state-updates of the second type stored in the second set of registers, wherein identifying the second quantity of state-updates includes maintaining a second counter corresponding to the second quantity of state-updates of the second type.

3. The computer-based method of claim 1, further comprising:
    sending a compute packet to the execution pipeline if (i) a first counter does not exceed a first predetermined value and (ii) a second counter does not exceed a second predetermined value.

4. The computer-based method of claim 3, wherein the first predetermined value is greater than the second predetermined value.

5. The computer-based method of claim 3, wherein the first set of registers comprises sixty-four registers and the second set of registers comprises eight registers, and the sending comprises:
    sending a compute packet to the execution pipeline if (i) the first counter does not exceed sixty four and (ii) the second counter does not exceed eight.

6. The computer-based method of claim 1, further comprising:
    parsing state-updates into the first type and the second type based on an identifier included in each respective state-update.

7. The computer-based method of claim 6, wherein the identifier comprises a register address and the parsing comprises:
    identifying a first state-update as the first type if the register address corresponding to the first state-update is within a predetermined address range; and identifying the first state-update as the second type if the register address corresponding to the first state-update is not within the predetermined address range.

8. The computer-based method of claim 1, wherein each of the second set of registers can hold a higher amount of data than each of the first set of registers.

9. A non-transitory computer readable medium containing instructions for execution on a processor, the processor comprising an execution pipeline, wherein the instructions when executed cause the processor to:
determine by a scheduler, upon receiving a state-update from a command buffer, whether the state-update is a first type state-update or a second type state-update based on whether a register address of the state-update is within a register address range, wherein a result of the determination is associated with an access frequency of the register address of the state-update; and
store the state-update based on the determination whether the state-update is the first type or the second type state-update, wherein updates corresponding to the first type state-updates are stored in a first set of registers and updates corresponding to the second type state-updates are stored in a second set of registers in the execution pipeline; and
wherein the execution pipeline executes the compute packets based on the state-update and the register address range.

10. The non-transitory computer readable medium of claim 9, wherein the processor is further adapted to:
identify a first quantity of state-updates of the first type stored in the first set of registers, wherein to identify the first quantity of state-updates, the processor is adapted to maintain a first counter corresponding to the first quantity of state-updates of the first type; and
identify a second quantity of state-updates of the second type stored in the second set of registers, wherein to identify the second quantity of state-updates, the processor is adapted to maintain a second counter corresponding to the second quantity of state-updates of the second type.

11. The non-transitory computer readable medium of claim 9, wherein the processor is further adapted to:
send a compute packet to the execution pipeline if (i) a first counter does not exceed a first predetermined value and (ii) a second counter does not exceed a second predetermined value.

12. The non-transitory computer readable medium of claim 11, wherein the first predetermined value is greater than the second predetermined value.

13. The non-transitory computer readable medium of claim 11, wherein the first set of registers comprises sixty-four registers and the second set of registers comprises eight registers, and the processor is adapted to:
send a compute packet to the execution pipeline if (i) the first counter does not exceed sixty four and (ii) the second counter does not exceed eight.

14. The non-transitory computer readable medium of claim 9, wherein the processor is further adapted to:
identify state-updates as the first type or the second type based on an identifier included in each respective state-update.

15. The non-transitory computer readable medium of claim 14, wherein the identifier comprises a register address, and wherein the processor is adapted to identify a first state-update by one of
identifying the first state-update as the first type if the register address corresponding to the first state-update is within a predetermined address range, and
identifying the first state-update as the second type if the register address corresponding to the first state-update is not within the predetermined address range.

16. The non-transitory computer readable medium of claim 9, wherein the processor is embodied in hardware description language software.

17. The non-transitory computer readable medium of claim 9, wherein the processor is embodied in one of Verilog hardware description language software and VHDL hardware description language software.

18. The non-transitory computer readable medium of claim 9, wherein each of the second set of registers can hold a higher amount of data than each of the first set of registers.

19. A processor for executing a series of compute packets, comprising:
a scheduler configured to, upon receiving a state-update from a command buffer, determine whether the state-update is a first type state-update or a second type state-update based on whether a register address of the state-update is within a register address range, wherein a result of the determination is associated with an access frequency of the register address of the state-update; and
an execution pipeline that stores the state-update based on the determination whether the state-update is the first type or the second type state-update, wherein updates corresponding to the first type state-updates are stored in a first set of hardware registers and updates corresponding to the second type state-updates are stored in a second set of hardware registers;
wherein a total quantity of registers in the execution pipeline storing the first type state-updates is greater than a total quantity of registers in the execution pipeline storing the second type state-updates;
wherein the execution pipeline executes the compute packets based on the state-update and the register address range.

20. The processor of claim 19, wherein the scheduler includes a first counter that identifies a first quantity of state-updates of the first type stored by the execution pipeline and a second counter that identifies a second quantity of state-updates of the second type stored by the execution pipeline.

21. The processor of claim 20, wherein the scheduler is configured to send a compute packet to the execution pipeline if (i) the first counter does not exceed a first predetermined value and (ii) the second counter does not exceed a second predetermined value.

22. The processor of claim 21, wherein the first predetermined value corresponds to a first quantity of hardware registers that store state-updates of the first type and the second predetermined value corresponds to a second quantity of hardware registers that store state-updates of the second type, and the first quantity of hardware registers is greater than the second quantity of hardware registers.

23. The processor of claim 22, wherein the first quantity of hardware registers is sixty-four registers and the second quantity of hardware registers is eight registers.

24. The processor of claim 19, wherein the scheduler identifies a state-update as one of the first type or the second type based on a register address included in the state-update.

25. The processor of claim 19, wherein each of the second set of registers can hold a higher amount of data than each of the first set of registers.

* * * * *